(12) United States Patent
Grimes (10) Patent No.: US 10,792,971 B2
(45) Date of Patent: *Oct. 6, 2020

(54) VEHICLE SUSPENSION PAN HARD BAR (TRACK BAR) TENSIONING AND DAMPING TECHNIQUE

(71) Applicant: Matthew Ethan Grimes, Athens, GA (US)

(72) Inventor: Matthew Ethan Grimes, Athens, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,748

(22) Filed: Aug. 29, 2018

(65) Prior Publication Data

US 2019/0009634 A1 Jan. 10, 2019

Related U.S. Application Data

(63) Continuation of application No. 15/244,189, filed on Aug. 23, 2016, now Pat. No. 10,099,530.

(51) Int. Cl.
*B60G 21/055* (2006.01)
*B60G 9/00* (2006.01)

(52) U.S. Cl.
CPC ............ *B60G 21/0553* (2013.01); *B60G 9/00* (2013.01); *B60G 2200/341* (2013.01); *B60G 2204/422* (2013.01); *B60G 2206/111* (2013.01)

(58) Field of Classification Search
CPC ...... B60G 2200/341; B60G 2200/3415; B60G 21/0553; B60G 2206/111; B60G 9/00; B60G 7/0063; B60G 2204/45; B60G 2204/44; B60G 2204/422; B60G 2204/42; B60G 2204/143; B60G 2204/414
See application file for complete search history.

(56) References Cited

U.S. PATENT DOCUMENTS

| 1,970,859 | A | * | 8/1934 | Lenze | ............... | B60G 7/003 |
| | | | | | | 267/67 |
| 2,562,595 | A | * | 7/1951 | Blue | ............... | B60G 13/04 |
| | | | | | | 267/134 |

(Continued)

OTHER PUBLICATIONS

Office Action in U.S. Appl. No. 15/244,189 dated Apr. 18, 2018, 10 pages (pp. 1-10 in pdf).

(Continued)

*Primary Examiner* — Timothy Wilhelm
(74) *Attorney, Agent, or Firm* — Mitch Harris, Atty at Law, LLC; Andrew M. Harris (57) ABSTRACT

A tensioning device for attachment to a vehicle suspension system reduces play at ends of a pan hard bar (track bar) of the vehicle suspension system, remedying instabilities that can occur in vehicle suspensions. The device can include a bracket clamped to the pan hard bar at a point between the ends of the pan hard bar, or may be otherwise mounted to a bracket formed on the pan hard bar in OEM installations. The other end of the device is secured to the frame or the axle of the vehicle, generally near an end of the pan hard bar. The device is pre-tensioned to apply force at the ends of the pan hard bar, and includes a damping plunger to also damp forces that vibrate the ends of the pan hard bar, further loosening attachments. The tension is field-adjustable and may be tuned for various applications.

20 Claims, 8 Drawing Sheets

(56) References Cited

U.S. PATENT DOCUMENTS

| | | | | |
|---|---|---|---|---|
| 2,588,682 A * | 3/1952 | Wyeth | B60G 13/04 | 267/134 |
| 2,815,202 A * | 12/1957 | Post | B60G 21/05 | 267/193 |
| 3,044,799 A * | 7/1962 | Fiala | B60G 21/00 | 280/5.508 |
| 3,532,334 A * | 10/1970 | Mays | B60G 17/08 | 267/187 |
| 3,601,425 A * | 8/1971 | Sampietro | B60G 21/055 | 280/124.166 |
| 3,869,015 A * | 3/1975 | Allison | B60G 7/00 | 180/352 |
| 4,359,123 A * | 11/1982 | Haupt | B62D 5/10 | 180/436 |
| 4,697,817 A * | 10/1987 | Jefferson | B62D 7/22 | 267/150 |
| 4,973,077 A * | 11/1990 | Kuwayama | B60G 21/0553 | 188/318 |
| 5,271,632 A * | 12/1993 | Glaser | B60G 9/02 | 280/124.112 |
| 5,439,243 A * | 8/1995 | Kato | B60G 9/00 | 280/124.106 |
| 5,527,053 A * | 6/1996 | Howard | B62D 6/04 | 180/421 |
| 5,536,028 A * | 7/1996 | Howard | B62D 6/04 | 280/90 |
| 6,179,328 B1 * | 1/2001 | Kawagoe | B60G 9/003 | 280/788 |
| 6,510,917 B2 * | 1/2003 | Cole | B62D 5/0418 | 180/436 |
| 6,588,777 B1 * | 7/2003 | Heyring | B60G 9/006 | 280/124.106 |
| 6,641,152 B1 * | 11/2003 | Suzuki | B60G 9/02 | 280/124.106 |
| 6,758,294 B2 * | 7/2004 | Peddycord | B62D 33/0604 | 180/89.12 |
| 6,820,877 B1 * | 11/2004 | Ichimura | B60G 9/02 | 180/89.13 |
| 7,229,086 B1 * | 6/2007 | Rogers | B60G 9/003 | 280/124.106 |
| 7,300,064 B2 * | 11/2007 | Johnson | B60G 9/00 | 280/124.106 |
| 7,331,627 B2 * | 2/2008 | Van Den Brink | B62D 33/0604 | 180/89.13 |
| 7,390,000 B2 * | 6/2008 | Lee | B60G 9/00 | 280/124.103 |
| 7,648,145 B2 * | 1/2010 | Wilson | B60G 9/027 | 280/124.107 |
| 7,918,469 B2 * | 4/2011 | Hoppert | B60G 7/001 | 280/124.102 |
| 7,959,168 B2 * | 6/2011 | Kiselis | B60G 7/005 | 280/124.106 |
| 8,459,673 B2 * | 6/2013 | Tempelman | B60G 7/001 | 280/124.111 |
| 8,733,771 B2 * | 5/2014 | Johnson | B60G 9/003 | 280/124.106 |
| 9,096,261 B2 * | 8/2015 | Aldrich | B62D 7/20 | |
| 9,174,504 B1 * | 11/2015 | Powell | B60G 7/006 | |
| 9,844,992 B2 * | 12/2017 | Aldrich | B62D 7/20 | |
| 2001/0004149 A1 * | 6/2001 | Fujiki | B60G 9/003 | 280/124.135 |
| 2002/0047303 A1 * | 4/2002 | Hosotani | B60G 9/00 | 301/125 |
| 2007/0085294 A1 * | 4/2007 | Lee | B60G 9/00 | 280/124.107 |
| 2009/0001680 A1 * | 1/2009 | Buhl | B60G 7/001 | 280/124.134 |
| 2012/0098227 A1 * | 4/2012 | Holst | B60G 7/003 | 280/124.106 |
| 2018/0056748 A1 | 3/2018 | Grimes | | |

OTHER PUBLICATIONS

Notice of Allowance in U.S. Appl. No. 15/244,189 dated Jun. 28, 2018, 7 pages (pp. 1-7 in pdf).

* cited by examiner

VEHICLE SUSPENSION PAN HARD BAR (TRACK BAR) TENSIONING AND DAMPING TECHNIQUE

This U.S. patent application is a Continuation of U.S. patent application Ser. No. 15/244,189, filed on Aug. 23, 2016 and published as U.S. Patent Application Publication No. 20180056748 on Mar. 1, 2018, and claims priority thereto under 35 U.S.C. § 120.

BACKGROUND OF THE INVENTION

1. Field of the Invention

The present invention relates generally to vehicle suspension systems, and more specifically, to pan hard bar tensioning and stabilizing technique that reduces play due to end mount wear.

2. Description of the Related Art

A vehicle suspension includes several components that permit axles of the vehicle to move with respect to the vehicle frame. In certain vehicles, a phenomenon known as "Death Wobble" can occur when a suspension component is worn such that an oscillating movement is set up when the vehicle is operated, disrupting the operation of the vehicle steering and/or causing the vehicle to move out of control of the operator.

Therefore, it would be desirable to provide a preventive and remedial solution for stabilizing against undesired operation in the vehicle suspension system, in particular to avoid or remedy the above-described phenomena.

SUMMARY OF THE INVENTION

The objective of stabilizing operation of vehicle suspension systems, in particular against the above-described Death Wobble phenomenon is provided in a tensioning device according to the invention that can be retrofit or factory-provided. The invention also includes methods of installation of the stabilizer and tensioning device, as well as suspension systems and entire vehicle in which the stabilizer and tensioning device is mounted.

The stabilizer and tensioning device includes a piston including damping functionality as well as spring-loading functionality, and is installed external to and alongside the panhard bar (also referred to as the track bar) of the vehicle suspension, in either the rear, front or both suspension systems. The first end of the stabilizer and tensioning device is clamped or otherwise fastened to the panhard bar itself, and the second end is secured to either the frame or the axle, generally near the end of the panhard bar that is coupled to the frame or axle to which the stabilizer and tensioning device is attached. The device is pre-tensioned, so that as wear occurs in one or both mounting ends of the panhard bar, the device will expand to maintain tension at both ends of the panhard bar. Additional adjustments can be made at any time to increase or remove tension as needed for different vehicle uses (e.g., on-road vs. off-road), and can be verified during routine maintenance.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns vehicle suspension systems and a device for tensioning ends of a pan hard bar in a vehicle suspension system. The tensioning device is mounted between either the vehicle frame or the axle to which the pan hard bar is mounted, and clamps, or is otherwise attached, to the pan hard bar. The tensioning device is either pre-tensioning during installation or includes a tension adjustment mechanism that permits pre-tensioning the pan hard bar after installation. "Tension" and "tensioning" as used herein does not indicate that both ends of the pan hard bar are pulled in opposite directions, leading to tension on the pan hard bar itself. Rather, the terms "tension" and "tensioning" as used herein refer to the pre-loading of the tensioning device so that the pan hard bar is pushed in one direction, causing compression of the rotatable connections of the pan hard bar to the frame and axle on the same side of the rotatable connections, i.e., in a direction toward the left or the right side of the vehicle, depending on whether the tensioning device is connected to the frame or the axle of the vehicle. The tensioning device maintains side-to-side tension on the joints at the ends of the pan hard bar at all times as the suspension travels. By applying the compression and having a tensioned spring within the tensioning device to maintain the compression, if the rotatable connection loosens due to wear, or already is loose, the tensioning device supplies force to maintain mechanical contact within the rotatable connections at the pan hard bar ends. The result prevents the pan hard bar from oscillating back and forth when displacement of the axle with respect to the frame occurs in a vehicle suspension, which can lead to the above-described Death Wobble phenomenon. Stabilizing the pan hard bar in this manner also prevents wear and other damage that may occur to the pan hard bar itself or surrounding connecting components.

Figure 1:
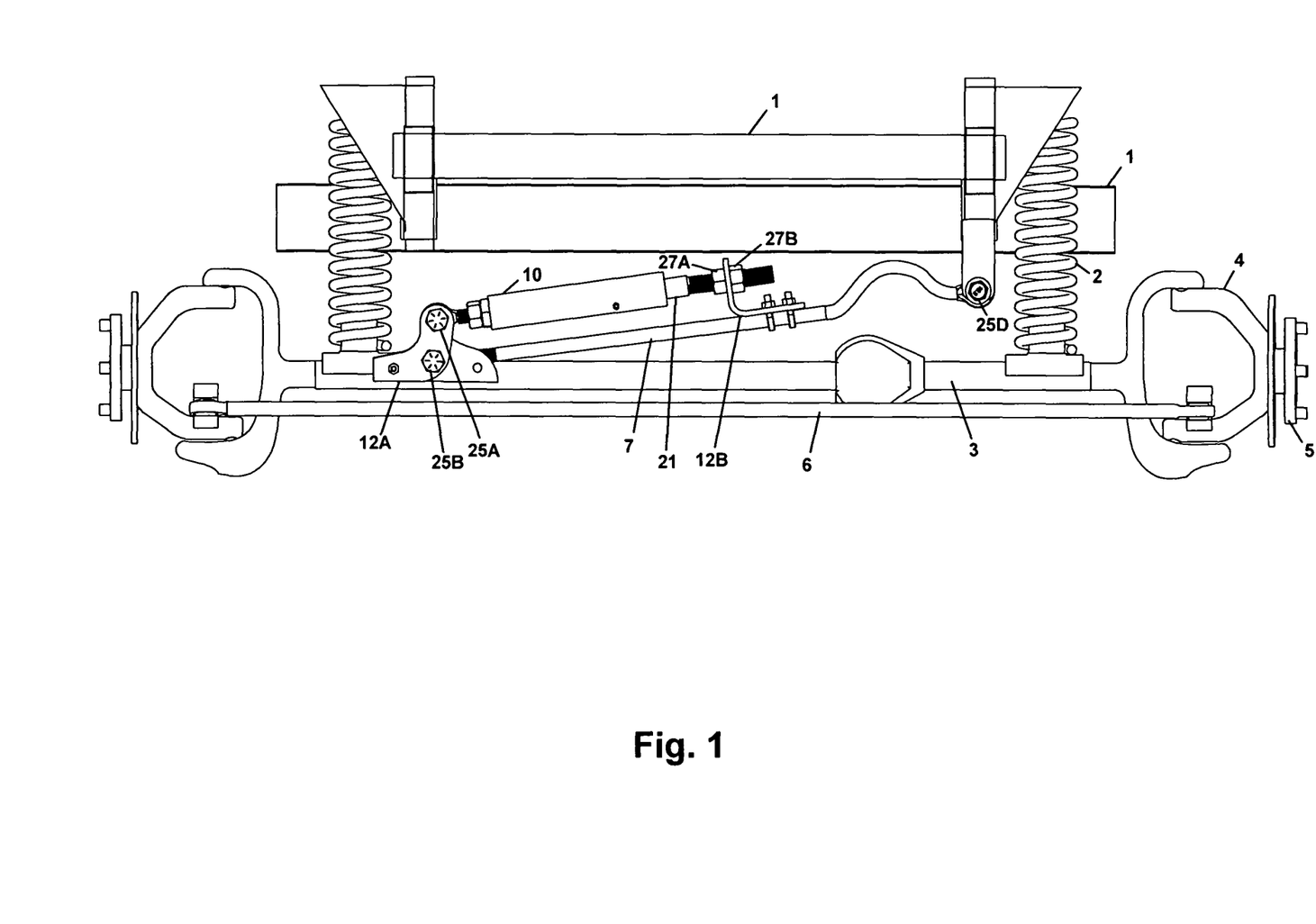
FIG. 1 is a front view of an exemplary vehicle front suspension including a pan hard bar tensioning device.

Referring now to FIG. 1, a vehicle suspension system is shown with a tensioning device 10, installed external to and alongside a pan hard bar 7. The suspension includes the front end of vehicle frame 1, a pair of coil springs 2, an axle 3 terminating in wheel hubs 5, a tie rod 6 that maintains the horizontal rotation of wheel hubs 5 in alignment according to the steering system (not shown), which turns wheel yokes 4. The depicted suspension is only an example of a suspension including pan hard bar 7, and the device and techniques disclosed herein may be used in other suspensions. For example coil springs 2 might alternatively be leaf springs, struts or other racing suspensions such as coil-over shock or strut type suspensions. The depicted suspension is generally the type of suspension that might exhibit the Death Wobble phenomenon, and is also illustrative of the type of suspension that might be lifted using longer coil springs 2 or spacers to alter the stock suspension to increase the height of vehicle frame 1 above wheel hubs 5.

Tensioning device 10, in the depicted example, is installed between a point along the extension of pan hard bar 7 and axle 3, but as will be discussed below with reference to other figures, tensioning device may alternatively be connected between pan hard bar 7 and vehicle frame 1. A clamping bracket 12B is used to secure an arm 21 extending from a first end of tensioning device 10 to pan hard bar 7, and a locking pair of nuts 27A, 27B is provided along a threaded extension of piston arm 21 to provide adjustment of tension within tensioning device 10. A second end of tensioning device 10 is secured to axle 3 by a bolt-through bracket 12A, which is secured by a bolt 25B that is used to secure the axle end of pan hard bar 7 and another bolt 25A that secures a rotating joint at the end of tensioning device 10. Nuts 27A, 27B are adjusted to push pan hard bar 7 rightwards in the view of the Figure, which compresses the rotary connection at the first end of pan hard bar 7 at bolt 25B against the outside edge of the rotary connection (i.e., toward the left of the vehicle) and compresses the rotary connection at the second end of pan hard bar 7 at a bolt 25D against the inside edge of that rotary connection. The resulting tension removes any "slop" otherwise present in the rotary connections at the ends of pan hard bar 7, which may be rubber inserts in a sleeve bushing at the ends of pan hard bar 7 or may be rod end bearings (also referred to as "Heim" or "Rose" joints). As mentioned above, the tensioning device maintains side-to-side tension on the joints at the ends of the pan hard bar at all times as the suspension travels. By applying the compression and having a tensioned spring within tensioning device 10 to maintain the compression, if the rotatable connection loosens due to wear, or already is loose, the tensioning device supplies force to maintain mechanical contact within the rotatable connections at the pan hard bar ends. The result prevents the pan hard bar from oscillating back and forth when displacement of the axle with respect to the frame occurs in a vehicle suspension, which can lead to the above-described Death Wobble phenomenon. Field adjustments can be made as needed to maintain the tension at the ends of pan hard bar 7, and may be adjusted for various uses, such as highway vs. off-road. Other bracket configurations may alternatively be used, such as those described below with reference to FIGS. 8A-8D.

While the assembly of tensioning device 10 to the suspension shown in FIG. 1 provides for after-market or OEM (original equipment manufacturer) installation, tensioning device 10 may be secured by attachment to an OEM-provided bracket formed in the casting of pan hard bar 7, or other suitable attachment. Further, while bracket 12A is shown as a removable and after-market installable bracket 12A bolted on to existing attachment points in axle 3 (or alternatively to vehicle frame 1 as will be discussed for different installations described below), attachment of the other end of tensioning device 10 to a bracket directly welded or cast at a location on axle 3 or vehicle frame 1. Additionally, while tensioning device 10 is illustrated herein as installed with piston arm 21 and clamping bracket 12B connected to pan hard bar 7, in other installations, the ends of tensioning device 10 might be reversed, while maintaining clamping bracket 12B on pan hard bar 7 and bolt-through bracket 12A on either the vehicle frame 1 or axle 3. In order to provide such an alternative arrangement piston arm 21 is connected to either the frame or the axle by securing bolt-through bracket 12A to piston arm 21 with an appropriate Heim joint or other rotary joint attachment. Then, the opposite end of tensioning device 10 is connected to clamping bracket 12B via a suitable bolting arrangement in order to connect tensioning device 10 to pan hard bar 7.

Figure 2:
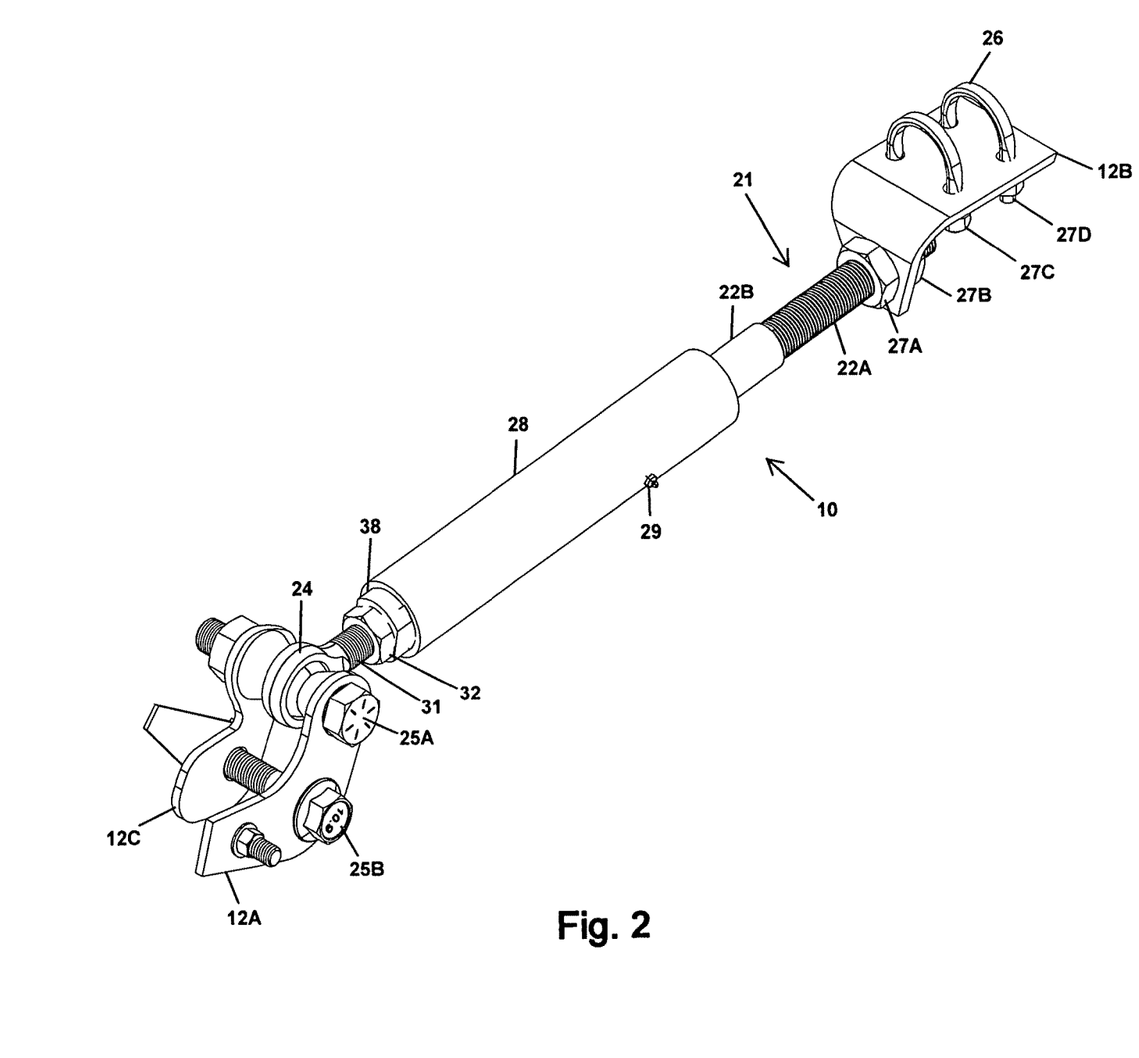
FIG. 2 is an isometric view of an exemplary vehicle suspension pan hard bar tensioning device that may be used in the installation depicted in FIG. 1.
Figure 3:
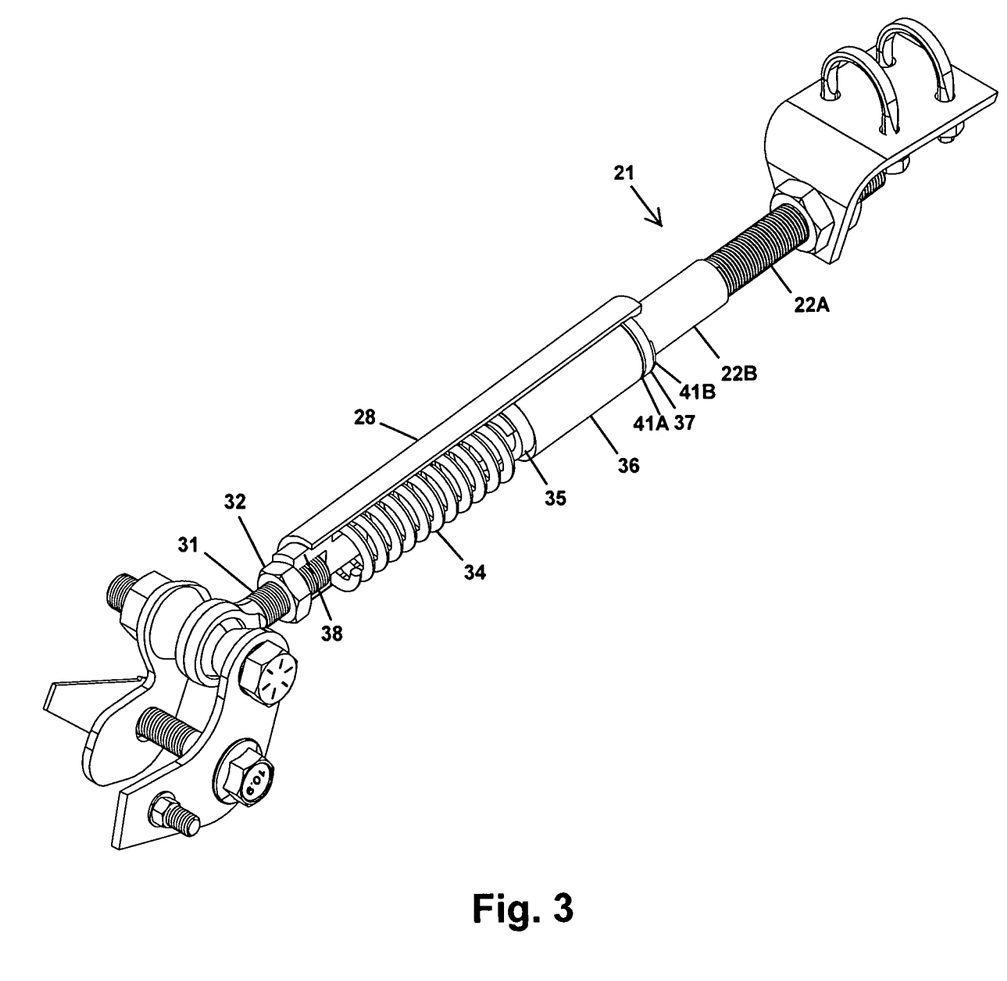
FIG. 3 is a cut-away isometric view of the tensioning device of FIG. 2.

Referring now to FIG. 2, details of exemplary tensioning device 10 are shown. A cylinder housing 28, including a lubrication port 29 for forced lubrication and houses internal components of tensioning device 10 that tension and damp piston arm 21, in order to pre-tension and stabilize pan hard bar 7 when tensioning device 10 is installed in a vehicle suspension. While tensioning device as described below uses a spring-loading mechanism in the instant example, the device may be oil-filled or gas-filled, e.g., Nitrogen or air shocks, without requiring a spring, to provide a restoring force that generates the tension when adjusted. Piston arm 21 extends from cylinder housing 28 and includes a threaded portion 22A on which locking nuts 27A, 27B are spun to secure clamping bracket 12B and a polished arm portion 22B that travels through a seal 37 secured at the end of cylinder housing 28, as shown in FIG. 3. A pair of clamps 26 (U-bolts) extend through clamping bracket 12B and are secured with nuts 27C, 27D (2 each not shown). Clamps 26 are placed around pan hard bar 7 during installation to secure clamping bracket 12B to pan hard bar 7. A threaded bung 38 is welded into the end of cylinder housing 28 opposite piston arm 21. A threaded shaft 31 terminating in a rod end bearing 24 is turned into threaded bung 38 and secured with lock nut 32. The external portion of threaded bung 38 has a spline for accepting a wrench. Bolts 25A, 25B secure bolt-through brackets 12A and 12C to rod end bearing 24 and the axle or frame of the vehicle during installation as discussed above.

Referring now to FIG. 3, internal details of exemplary tensioning device 10 are shown in a cut-away view. Within cylinder housing 28, piston arm 21, which is a part of a piston sealed within cylinder housing 28 terminates in a plunger 35 inserted through a piston sleeve 36 and having a reduced-diameter end that fits into an end of a spring 34 to keep the end of spring 34 centered. Plunger 35 is secured in cylinder housing 28 with a first lock ring 41A and sealed in cylinder housing 28 by a seal 37 secured by a second lock ring 41B, so that plunger 35 forms a damper. The opposite end of spring 34 is pressed against threaded bung 38. A protrusion of threaded bung 38 extends into spring 34 and maintains the center of spring 34 along the axis of spring loaded tensioning device 10. Lubrication port 29 (not shown) as described in FIG. 2, provides for injection of lubrication around plunger 35. A channel is provided through plunger 35 for the movement of lubrication between the ends and sides of plunger 35 and piston sleeve 36.

Figure 4:
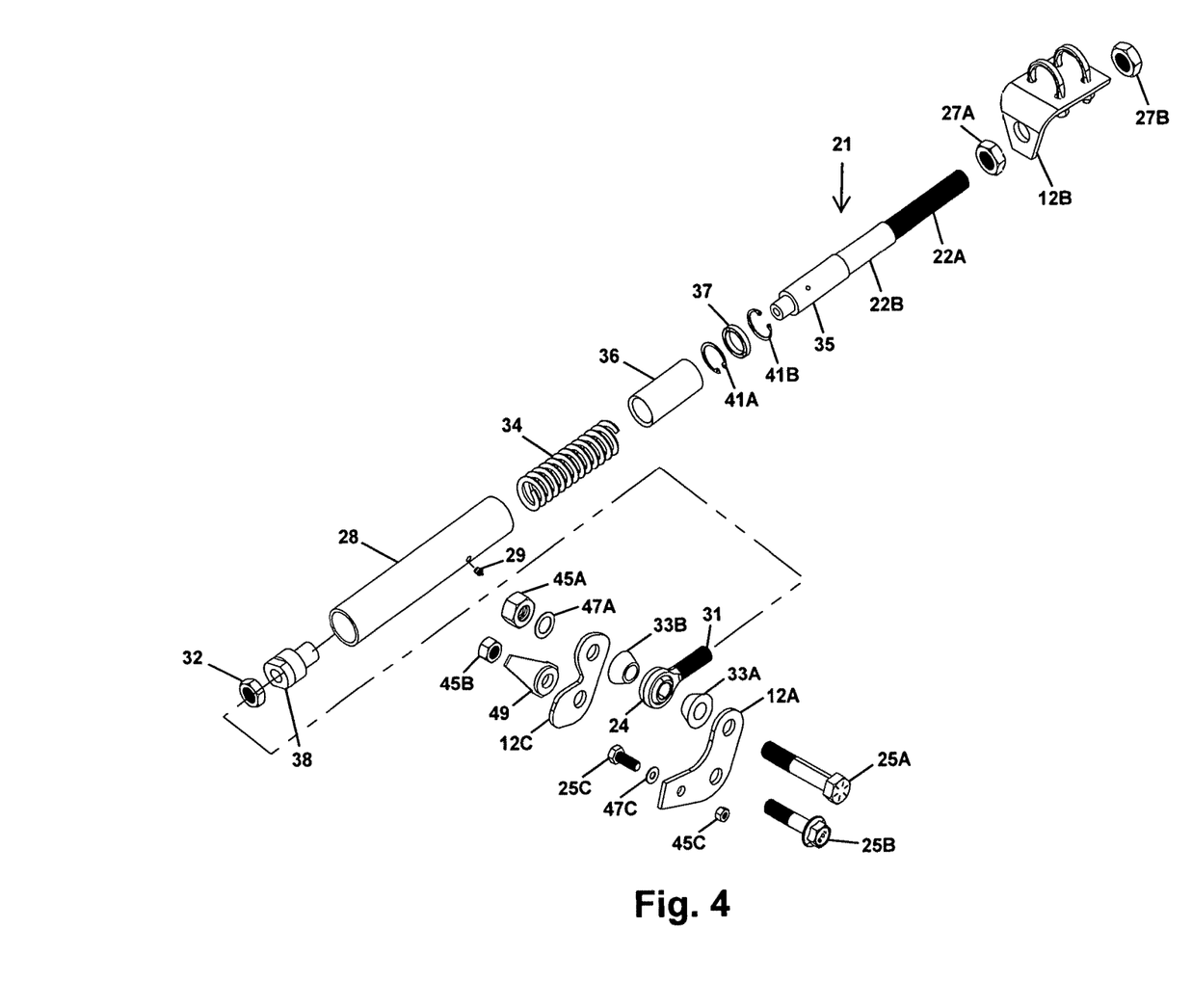
FIG. 4 is an exploded isometric view of the tensioning device of FIGS. 2-3.

Referring now to FIG. 4, an exploded view of exemplary tensioning device 10 is shown. Within cylinder housing 28, when assembled, sleeve 36 and plunger 35 are secured with first lock ring 41A and seal 37 is secured with second lock ring 41B so that first lock ring 41A prevents sleeve 36 and spring 34 from compressing seal 37. Second lock ring 41B is displaced from first lock ring 41A at a distance that provides the proper compression of seal 37. Details of bolt-through brackets 12A and 12C are shown, including conical spacers 33A, 33B used to provide free movement of rod end bearing 24 between brackets 12A, 12C, when bolts 25A, 25B are assembled with nuts 45A, 45B and a washer 47A. A locknut 49 may be used in place of nut 45B to provide means for stopping rotation of locknut 49 without requiring a second wrench and access to a back side of bolt-through bracket 12C. A third bolt 25C, washer 47C and nut 45C can be installed to further couple bolt-through brackets 12A, 12C to the frame or the axle to which bolt-through brackets 12A, 12C are connected.

Figure 5:
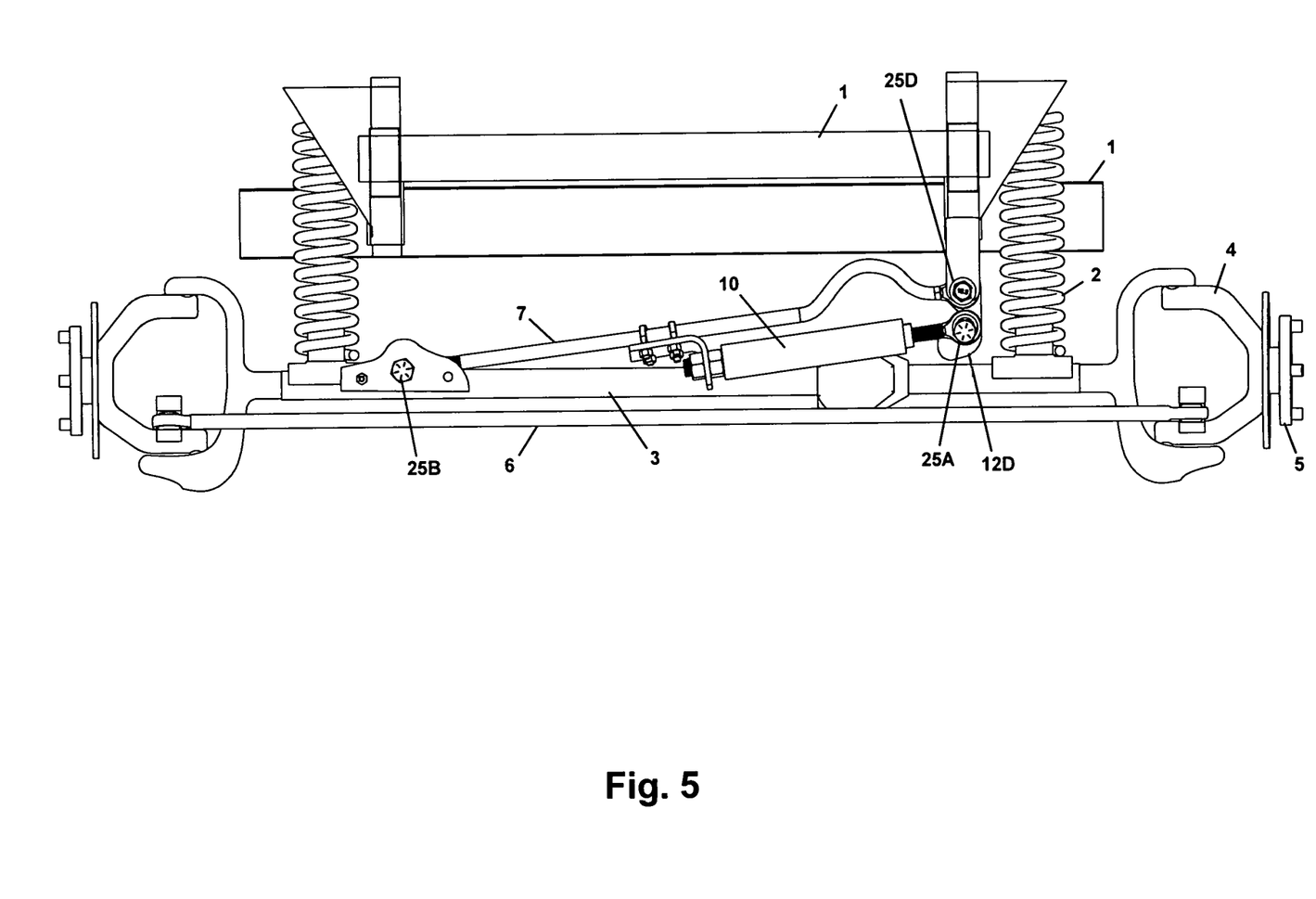
FIG. 5 is a front view of the exemplary vehicle front suspension of FIG. 1 including a pan hard bar tensioning device installed in an alternate location.

Referring now to FIG. 5, the vehicle front suspension system of FIG. 1 is shown with tensioning device 10 installed in an alternative location. In the depicted installation, rather than attaching tensioning device 10 to axle 3 as described above with reference to FIG. 1, in FIG. 5 the second end of tensioning device 10 is attached to frame 1 via bolt 25A. Otherwise, the operation and structure of tensioning device 10 is as described above with reference to FIG. 1. An alternative bracket 12D is generally needed and in the depicted embodiment alternative bracket 12D is the front one a set of bolt-through brackets similar to bolt-through brackets 12A, 12C shown in FIGS. 1-4, but without a third bolt hole. Other bracket configurations may alternatively be used, such as those described below with reference to FIGS. 8A-8D. In the depicted embodiment, tensioning device 10 pushes pan hard bar 7 leftwards in the Figure, causing the rotary connections between pan hard bar 7 to be compressed on an opposite side from those described with respect to FIG. 1.

Figure 6:
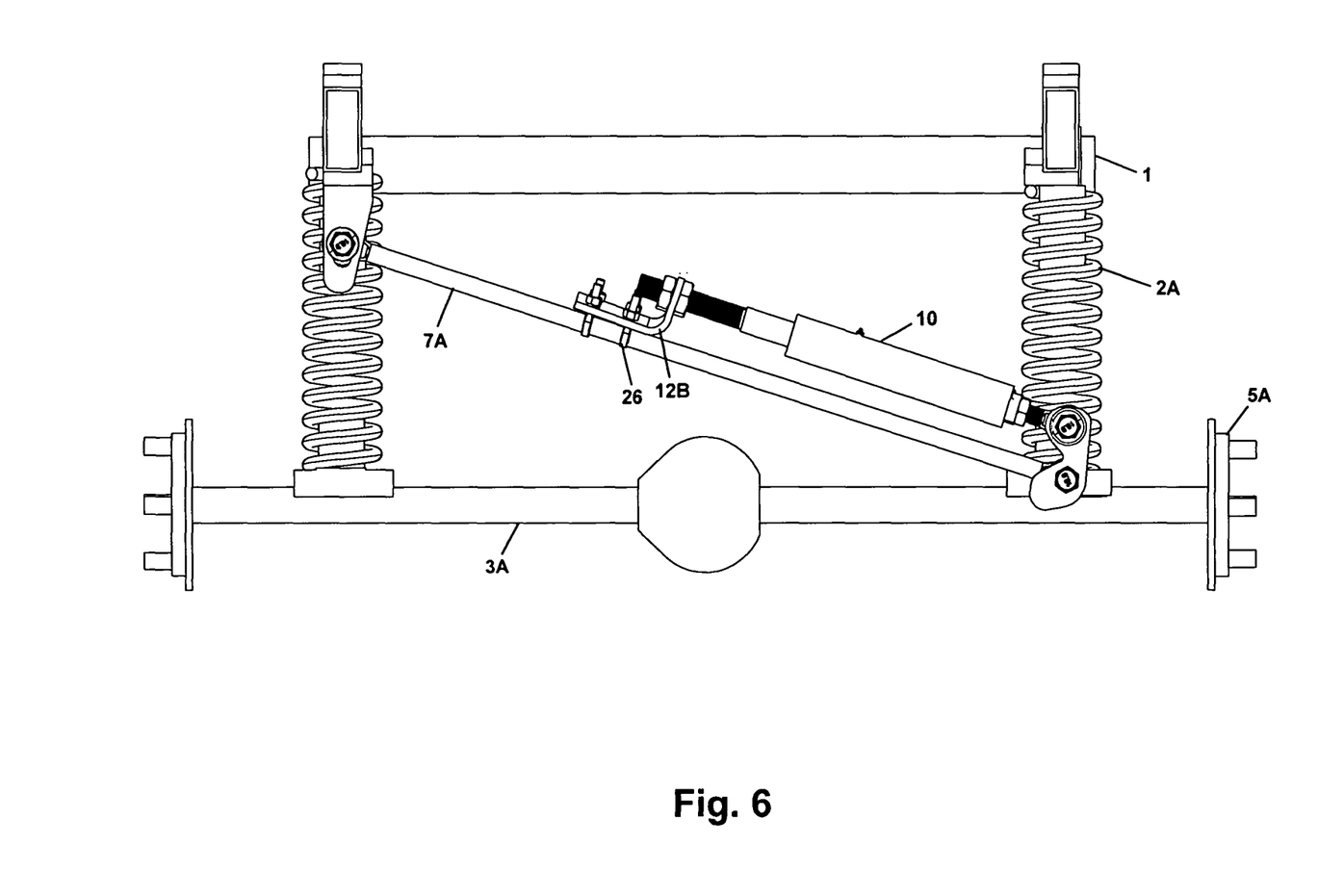
FIG. 6 is a rear view of an exemplary vehicle rear suspension including a pan hard bar tensioning device installed in a first location.
Figure 7:
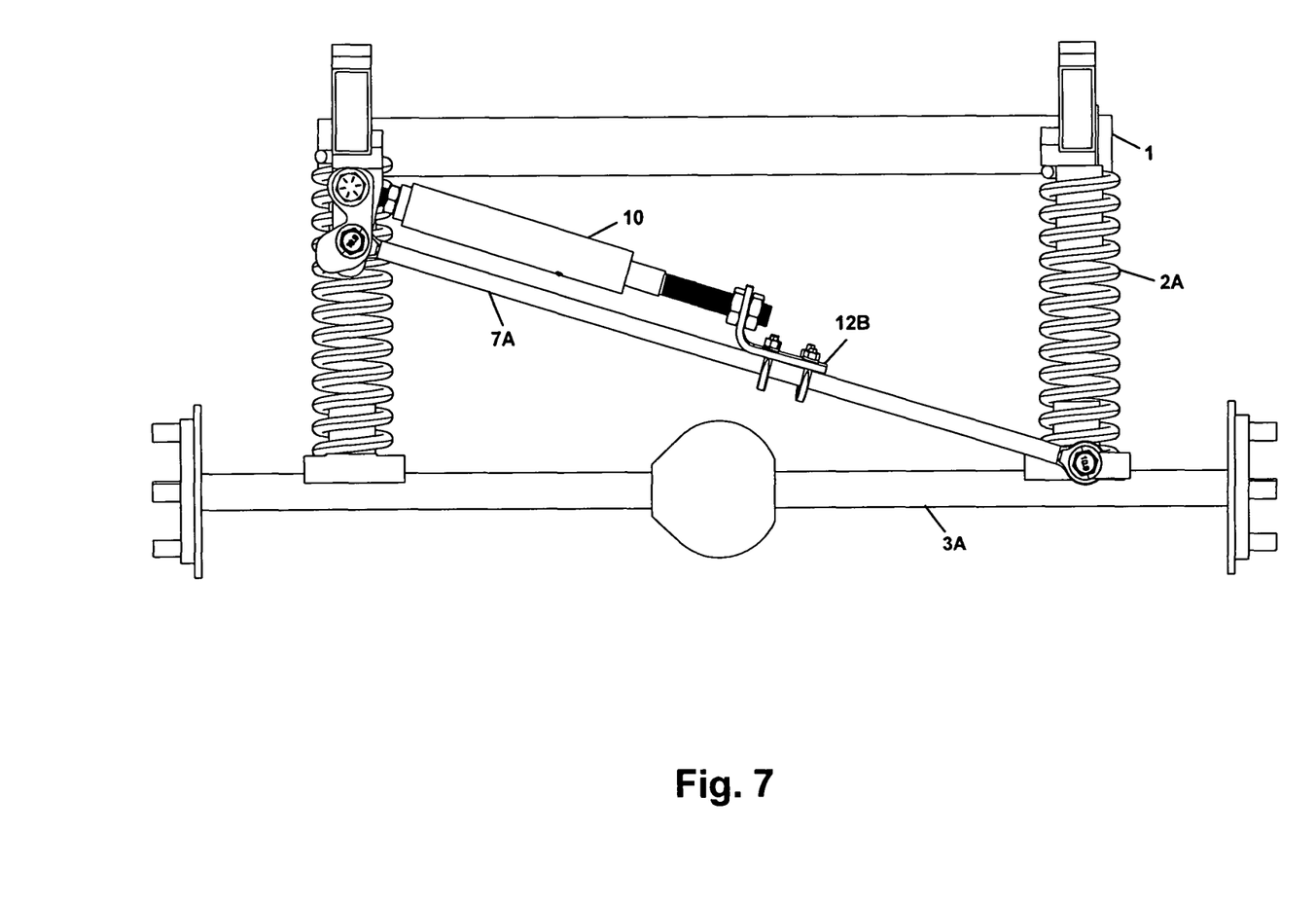
FIG. 7 is a rear view of the exemplary vehicle rear suspension of FIG. 6 including a pan hard bar tensioning device installed in a second alternate location.

Referring now to FIG. 6, a vehicle rear suspension system is shown. In the depicted installation, tensioning device 10 is installed in the rear suspension of the vehicle and may be performed in combination with including another tensioning device 10 in the front suspension as shown in FIG. 1 or FIG. 5. Otherwise, the operation and structure of tensioning device 10 is as described above with reference to FIG. 1. In the depicted installation, tensioning device 10 is secured to a rear axle 3A at the other end, to a pan hard bar 7A of the rear suspension, including rear springs 2A. Referring now to FIG. 7, the rear suspension of FIG. 6 is shown, with tensioning device 10 shown in an alternative location. In the depicted installation, rather than attaching tensioning device 10 to axle 3A, instead the second end of tensioning device 10 is attached to frame 1. Otherwise, the operation and structure of tensioning device 10 is as described above with reference to FIG. 6.

In general, while the above illustrations are provided to show a particular installation example, custom brackets or field modifiable brackets will generally be used for installing the second end of tensioning device 10, i.e., the end opposite clamp-on bracket 12B and that includes a rotating joint such as Heim joint 24. Referring to FIG. 8A-FIG. 8D, examples of various bracket installations are shown, as an alternative to bolt-through brackets 12A, 12C, which can be used to secure the second end of tensioning device 10 to vehicle frame 1 or axle 3 in the examples given above. In such installations, the bolt securing the end of pan hard bar might not be used as part of the mounting scheme for the tensioning device 10. While it is desirable, in general, to have tensioning device 10 as close to parallel as possible with the primary extension of pan hard bar 7, in some installations such a condition might not be practical, and tensioning device 10 may be disposed at some angle away from parallel. As the angle becomes greater than, for example 30 degrees, the efficacy of the tensioning device is reduced, since the tensioning force and damping effect are split between the extension direction of pan hard bar 7, which provides the compressive forces described above in the direction that pan hard bar may vibrate, and a direction perpendicular to pan hard bar 7, which does not.

Figure 8A:
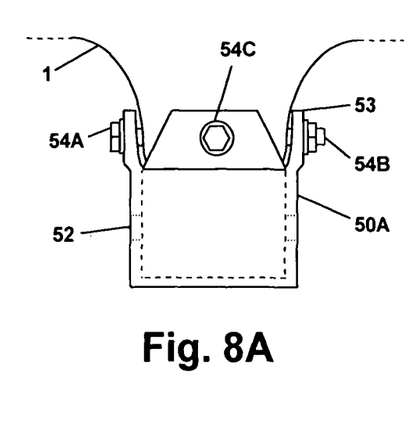
FIGS. 8A-8D are pictorial views of alternative mounting brackets that may be used in installations of the tensioning device of FIGS. 2-4.
Figure 8B:
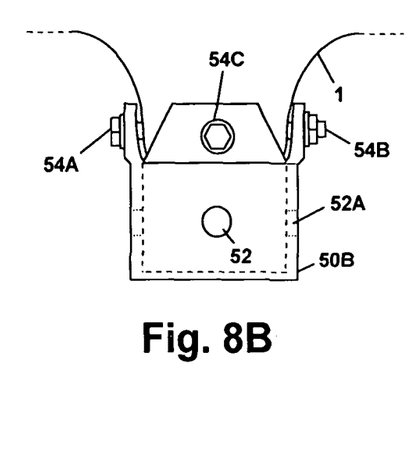
Figure 8C:
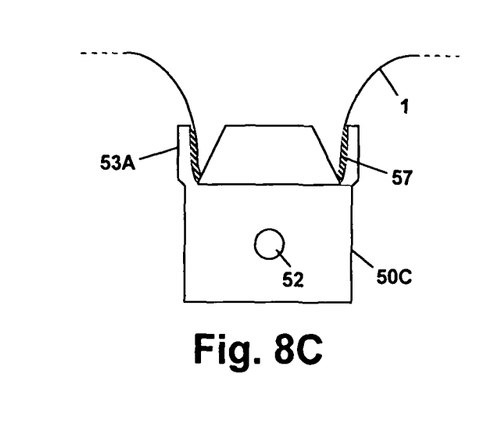
Figure 8D:
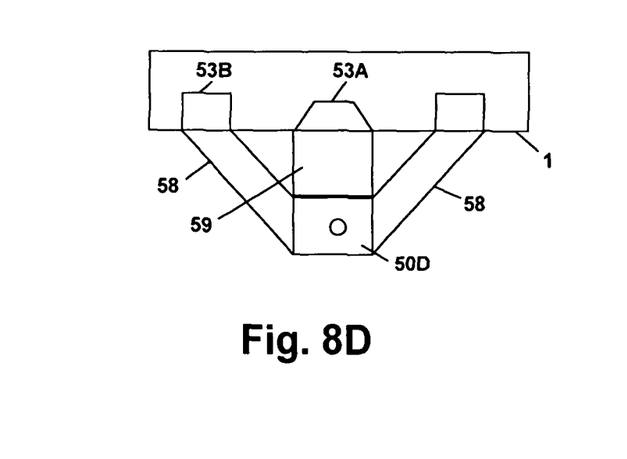

FIG. 8A shows a bracket 50A secured to an extension of vehicle frame 1 across the vehicle by washer/bolt combination 54A and washer/nut combination 54B and which provides additional gusset mounting holes 52 in a direction along the length of the vehicle for securing rod end bearing 24 of tensioning device 10 via flanges 53 that extend upward from the main body of bracket 50A. Bracket 50A may also include additional holes for additional bolt/washer combination 54C to bolt bracket 50A to a vehicle frame. FIG. 8B shows another bracket 50B, secured to an extension of vehicle frame 1 down the length of the vehicle and provides through holes 52 extending in the same direction. Sides of bracket 50B may include holes 52A for providing other bracket mounting options, or may be left blank for customization. FIG. 8C shows a bracket 50C similar to that of FIG. 8B, but with welds 57 attaching flanges 53A to frame 1. FIG. 8D shows another bracket 50D that includes braces 58 securing bracket 50D to frame 1 via additional flanges 53B via welds (not shown). The configuration of FIG. 8D may omit flanges 53A and upper portion 59 of bracket 50D if bracket 50D is needed to avoid interference with a feature under frame 1, or may be used to provide a lower position for securing the end of tensioning device 10.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A vehicle suspension, including:
an axle movably coupled to a frame of a vehicle;
a pan hard bar having a first end rotatably coupled to the axle and a second end rotatably coupled to the frame to control combined vertical and horizontal movement of the axle with respect to the frame; and
a tensioning device external to the pan hard bar and mounted alongside the pan hard bar, the tensioning device having a first end attached to the pan hard bar at a position between the first end and the second end of the pan hard bar and a second end rotatably attached to either the frame or the axle, wherein the tensioning device is pre-loaded to apply additional tension to the connection between the first end and the axle and to the connection between the second end of the pan hard bar and the frame.

2. The vehicle suspension of claim 1, wherein the tensioning device includes an in-line adjustment mechanism for adjusting the additional tension applied to the connection between the first end of the pan hard bar and the axle and to the connection between the second end of the pan hard bar and the frame.

3. The vehicle suspension of claim 1, further comprising a pair of brackets, wherein a first one of the brackets is secured to the first end of the tensioning device and a second one of the brackets is secured to the second end of the tensioning device, wherein the pair of brackets includes a clamp bracket for attachment of the first end of the tensioning device to the pan hard bar and a bolt-through bracket for attachment of the second end of the tensioning device to the frame or the axle.

4. The vehicle suspension of claim 3, wherein the bolt-through bracket includes a first bolt hole for attaching the tensioning device to the bolt-through bracket and a second bolt hole for attaching the bolt-through bracket to a mounting bolt that couples the first end of the pan hard bar to the frame or the second end of the pan hard bar to the axle.

5. The vehicle suspension of claim 4, wherein the bolt-through bracket is a first bolt-through bracket, wherein the pair of brackets further includes a second bolt-through bracket, wherein the tensioning device further comprises a rotatable link disposed at the second end of the tensioning device, wherein the first bolt-through bracket is mounted on a first side of the rotatable link and the second bolt-through bracket is mounted on a second side of the rotatable link by the mounting bolt and a bolt extending through the first bolt hole.

6. The vehicle suspension of claim 5, wherein the first bolt-through bracket includes a third bolt hole for securing the first bolt-through bracket to the frame or the axle to secure the first bolt-through bracket against rotation.

7. The vehicle suspension of claim 5, wherein the rotatable link is a spherical rod end bearing.

8. The vehicle suspension of claim 1, wherein the tensioning device is a gas-filled or fluid-filled tensioning device that provides the additional tension without including a spring.

9. A method of pre-tensioning ends of a pan hard bar installed in a vehicle suspension system, the method comprising:
   first attaching a first end of a tensioning device to a pan hard bar of the vehicle suspension system at a position between the first end and the second end of the pan hard bar, wherein the tensioning device is external to the pan hard bar and mounted alongside the pan hard bar;
   first attaching a second end of the tensioning device so that the second end of the tensioning device is rotatably attached to either a frame or an axle; and
   pre-tensioning the tensioning device to apply additional tension to connections between a first end of the pan hard bar and the axle and between the second end of the pan hard bar and the frame.

10. The method of claim 9, wherein the pre-tensioning is performed by adjusting an in-line adjustment mechanism for adjusting the additional tension applied to the connection between the first end of the pan hard bar and the axle and to the connection between the second end of the pan hard bar and the frame.

11. The method of claim 9, further providing damping of axial motion between the first end and the second end of the tensioning device via a plunger incorporated in the tensioning device.

12. The method of claim 9, wherein the first attaching attaches a clamp bracket at the first end of the tensioning device to the pan hard bar, and wherein the second attaching attaches a bolt-through bracket extending between the second end of the tensioning device to the frame or the axle of the vehicle suspension system.

13. The method of claim 12, wherein the bolt-through bracket includes a first bolt hole for attaching the tensioning device to the bolt-through bracket and a second bolt hole for attaching the bolt-through bracket to a mounting bolt that couples the first end of the pan hard bar to the frame or the second end of the pan hard bar to the axle, and wherein the second attaching comprises installing a bolt through the first bolt hole and the mounting bolt through the second bolt hole.

14. The method of claim 13, wherein the bolt-through bracket is a first bolt-through bracket, wherein the tensioning device further comprises a rotatable link disposed at the second end of the tensioning device, and wherein the second attaching mounts the first bolt-through bracket on a first side of the rotatable link and the second bolt-through bracket on a second side of the rotatable link.

15. A vehicle suspension, including:
   an axle movably coupled to a frame of a vehicle;
   a pan hard bar having a first end rotatably coupled to the axle and a second end rotatably coupled to the frame to control combined vertical and horizontal movement of the axle with respect to the frame;
   a clamp bracket;
   a bolt-through bracket; and
   a tensioning device having a first end attached to the pan hard bar by the clamp bracket at a position between the first end and the second end of the pan hard bar and a second end rotatably attached to either the frame or the axle by the bolt-through bracket, wherein the tensioning device is pre-loaded to apply additional tension to the connection between the first end and the axle and to the connection between the second end of the pan hard bar and the frame.

16. The vehicle suspension of claim 15, wherein the tensioning device includes an in-line adjustment mechanism for adjusting the additional tension applied to the connection between the first end of the pan hard bar and the axle and to the connection between the second end of the pan hard bar and the frame.

17. The vehicle suspension of claim 15, wherein the bolt-through bracket includes a first bolt hole for attaching the tensioning device to the bolt-through bracket and a second bolt hole for attaching the bolt-through bracket to a mounting bolt that couples the first end of the pan hard bar to the frame or the second end of the pan hard bar to the axle.

18. The vehicle suspension of claim 17, wherein the bolt-through bracket is a first bolt-through bracket, and further comprising a second bolt-through bracket, wherein the tensioning device further comprises a rotatable link disposed at the second end of the tensioning device, wherein the first bolt-through bracket is mounted on a first side of the rotatable link and the second bolt-through bracket is mounted on a second side of the rotatable link by the mounting bolt and a bolt extending through the first bolt hole.

19. The vehicle suspension of claim 18, wherein the first bolt-through bracket includes a third bolt hole for securing the first bolt-through bracket to the frame or the axle to secure the first bolt-through bracket against rotation.

20. The vehicle suspension of claim 15, wherein the tensioning device is a gas-filled or fluid-filled tensioning device that provides the additional tension without including a spring.

* * * * *